US012592556B2

(12) United States Patent
Ghassempour Aghamolki et al.

(10) Patent No.: US 12,592,556 B2
(45) Date of Patent: Mar. 31, 2026

(54) NETWORK PROTECTOR FOR SECONDARY DISTRIBUTION NETWORK THAT INCLUDES DISTRIBUTED ENERGY RESOURCES

(71) Applicant: Eaton Intelligent Power Limited, Dublin (IE)

(72) Inventors: Hossein Ghassempour Aghamolki, Edina, MN (US); Swaroop Gajare, Cranberry Township, PA (US); Amal Thomas, Changanassery (IN); Amit Govind Kolge, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 497 days.

(21) Appl. No.: 17/960,278

(22) Filed: Oct. 5, 2022

(65) Prior Publication Data

US 2023/0135520 A1     May 4, 2023

Related U.S. Application Data

(60) Provisional application No. 63/272,949, filed on Oct. 28, 2021.

(51) Int. Cl.
H02H 3/38       (2006.01)
H02H 1/00       (2006.01)
H02J 3/16        (2006.01)

(52) U.S. Cl.
CPC .......... *H02H 3/382* (2013.01); *H02H 1/0007* (2013.01); *H02J 3/16* (2013.01)

(58) Field of Classification Search
CPC ........ H02H 1/0007; H02H 3/17; H02H 3/382; H02H 7/267; H02J 3/001; H02J 3/16; H02J 3/381; H02J 13/00002
(Continued)

(56) References Cited

U.S. PATENT DOCUMENTS 5,701,226 A     12/1997  Gelbien et al.
6,160,690 A     12/2000  Matsumoto et al.
(Continued)

FOREIGN PATENT DOCUMENTS

CN        104836455 A      8/2015
CN        111651845 A  *  9/2020    ............. G06F 30/18
(Continued)

OTHER PUBLICATIONS

Machine translation of Bi et al. Chinese Patent Document CN 111651845 A Sep. 2020 (Year: 2020).*
(Continued)

*Primary Examiner* — Kevin J Comber
(74) *Attorney, Agent, or Firm* — DiBerardino McGovern IP Group LLC

(57)           ABSTRACT
A network protector includes a resettable switching apparatus configured to electrically connect to a low-voltage feeder
(Continued)

100 of a secondary distribution network; a switch control configured to control a state of the resettable switching apparatus to thereby determine whether electrical current flows through the switching apparatus; and a controller configured to: determine whether a fault condition exists; and if a fault condition does not exist, allow electrical power to flow through the resettable switching apparatus in any direction.

20 Claims, 11 Drawing Sheets

(58) Field of Classification Search
USPC .......................................................... 361/79
See application file for complete search history.

(56) References Cited

U.S. PATENT DOCUMENTS

| | | | |
|---|---|---|---|
| 6,504,693 | B1 | 1/2003 | Moffat et al. |
| 6,671,151 | B2 | 12/2003 | Smith et al. |
| 6,816,757 | B1 | 11/2004 | De La Ree et al. |
| 10,096,991 | B2 | 10/2018 | Smith et al. |
| 11,705,713 | B1 | 7/2023 | Smith et al. |
| 2004/0130835 | A1 | 7/2004 | Wahlroos et al. |
| 2006/0165023 | A1 | 7/2006 | Faulkner et al. |
| 2007/0086133 | A1 | 4/2007 | Loucks et al. |
| 2015/0124358 | A1 | 5/2015 | Hulse |
| 2017/0133849 | A1* | 5/2017 | Feng ......................... G05F 1/70 |
| 2017/0331274 | A1 | 11/2017 | Akke |
| 2017/0358919 | A1* | 12/2017 | Smith ...................... H02H 3/26 |
| 2019/0027924 | A1 | 1/2019 | O'Regan et al. |
| 2020/0044436 | A1 | 2/2020 | Alibert et al. |
| 2020/0259320 | A1 | 8/2020 | Guo et al. |

FOREIGN PATENT DOCUMENTS

| | | |
|---|---|---|
| JP | 4519337 B2 | 5/2010 |
| JP | 2014017947 A | 1/2014 |
| JP | 2014023303 A | 2/2014 |

OTHER PUBLICATIONS

Avinash Aithal et al. "Performance of an electrical distribution network with Soft Open Point during a grid side AC fault" Applied Energy. vol. 227. pp. 262-272. ISSN 0306-2619. Accessible at: https://www.sciencedirect.com/science/article/pii/S0306261917311686 (2018).

N. Vineeth et al. "High Impedance Fault detection in Low Voltage Distribution Systems Using Wavelet and Harmonic Fault Indices" 2020 IEEE International Conference on Power Electronics. Smart Grid and Renewable Energy 'PESGRE2020). Cochin, India. pp. 1-6. (2020).

Nigel Ramon Jordan. "Integration of network protector relays on downtown distribution networks with penetration of renewable energy." LSU Master's Theses. 2647. 101 total pages. (2014).

P. Mohammadi et al. "Challenges of PV Integration in Low-Voltage Secondary Networks," in IEEE Transactions on Power Delivery. vol. 32, No. 1. pp. 525-535. doi: 10.1109/TPWRD.2016.2556692. (Feb. 2017).

T.E. McDermott et al. "Relaying for Distribution and Microgrids Evolving from Radial to Bidirectional Power Flow." PNNL-29145. 90 total pages. (Sep. 2019).

Temitayo O. Olowu, et al. "Future Challenges and Mitigation Methods for High Photovoltaic Penetration: a Survey." Energies. 1782. doi:10.3390/en11071782. 32 total pages. (2018).

Wanyu Cao et al. "Operating principle of Soft Open Points for electrical distribution network operation" Applied Energy. vol. 164. ISSN 0306-2619. Accessible at: https://www.sciencedirect.com/science/article/pii S0306261915015718. pp 245-257. (2016).

\* cited by examiner

NETWORK PROTECTOR FOR SECONDARY DISTRIBUTION NETWORK THAT INCLUDES DISTRIBUTED ENERGY RESOURCES

CROSS-REFERENCE TO RELATED APPLICATION

This application claims the benefit of U.S. Provisional Application No. 63/272,949, filed on Oct. 28, 2021 and titled NETWORK PROTECTOR FOR SECONDARY DISTRIBUTION NETWORK THAT INCLUDES DISTRIBUTED ENERGY RESOURCES, which is incorporated herein by reference in its entirety.

TECHNICAL FIELD

This disclosure relates to a network protector for a secondary distribution network that includes distributed energy resources (DER).

BACKGROUND

A network protector permits two or more electrical feeders to be connected to a common low-voltage bus. The network protector may include a sensor system the monitors electrical conditions on one of the electrical feeders and a resettable switching apparatus that controls current flow in the one of the electrical feeders based on the monitored electrical conditions.

SUMMARY

In one aspect, a system includes a network protector. The network protector includes a resettable switching apparatus configured to control an electrical connection between a distribution transformer and a first electrical feeder of a secondary electrical distribution network, the secondary distribution network electrically connected to one or more distributed energy resources (DERs). The network protector also includes a controller configured to: determine, after a test signal is provided to the secondary electrical distribution network, whether the secondary electrical distribution network has a radial structure or a mesh structure; if the secondary electrical distribution network has a radial structure, control the resettable switching apparatus to open and disconnect the distribution transformer from the first electrical feeder of the secondary electrical distribution network; and if the secondary electrical distribution network has a mesh structure, control the resettable switching apparatus such that the distribution transformer and the first electrical feeder are connected to thereby allow one or more of the DERs to provide electrical power to the secondary electrical distribution network.

Implementations may include one or more of the following features. The network protector also may include a sensor configured to measure one or more electrical properties of electrical power in the first electrical feeder, and the controller also may be configured to: determine whether there is a change in at least one measured electrical property; and if there is a change in at least one electrical property, cause the test signal to be provided to the secondary electrical distribution network. The one or more electrical properties may include any of current flow direction, voltage magnitude, voltage phase angle, active power, reactive power, and impedance.

The controller also may be configured to cause the test signal to be provided the secondary network by controlling the distribution transformer to perform a tap change operation, and, to determine whether the secondary electrical distribution network has a radial structure, the controller may be configured to compare a voltage on a source side of the distribution transformer after the tap change operation to the voltage on the source side of the distribution transformer before the tap change operation. In some implementations, the tap change operation is associated with a tap step voltage. In these implementations, if the voltage on the source side changes by the tap step voltage, the secondary distribution network is determined to have a radial structure, and if the voltage on the source side does not change by the tap step voltage, the secondary distribution network is determined to have a mesh structure. The system also may include the distribution transformer.

In some implementations, the controller is further configured to cause the test signal to be provided to the first electrical feeder by controlling a reactive power generation apparatus to inject the test signal into the secondary electrical distribution network, the test signal having a known amount of reactive power; and, to determine whether the secondary electrical distribution network has a radial structure, the controller is configured to: compare an amount of reactive power on a side of the reactive power generation apparatus after the test signal is provided to the first electrical feeder to an amount of reactive power on the side of the reactive power generation apparatus before the test signal was provided. If the reactive power on the side of the reactive power generation apparatus changes by the known amount of reactive power, the secondary electrical distribution network may be determined to have a radial structure; and if the reactive power on the side of the reactive power generation apparatus does not change by the known amount of reactive power, the secondary electrical distribution may be determined to have a mesh structure. If the reactive power on the side of the reactive power generation apparatus does not change, the secondary electrical distribution network may be determined to have a radial structure; and if the reactive power on the side of the reactive power generation apparatus changes, the secondary electrical distribution may be determined to have a mesh structure. The system also may include the reactive power generation apparatus. The reactive power generation apparatus may be a capacitor bank or an inverter.

The controller may be further configured to: determine whether the resettable switching apparatus is open; if the resettable switching apparatus is open, compare a magnitude of a voltage vector on a source side of the distribution transformer to a magnitude of a voltage vector on a secondary network side of the distribution transformer; and determine whether to close the resettable switching apparatus based on the comparison.

In another aspect, a network protector includes a resettable switching apparatus configured to electrically connect to a low-voltage feeder of a secondary distribution network; a switch control configured to control a state of the resettable switching apparatus to thereby determine whether electrical current flows through the switching apparatus; and a controller configured to: determine whether a fault condition exists; and if a fault condition does not exist, allow electrical power to flow through the resettable switching apparatus in any direction.

Implementations may include one or more of the following features.

The resettable switching apparatus may be an air circuit breaker.

The controller may be configured to determine whether a fault condition exists by determining a structure of the low-voltage feeder. The controller may be further configured to: cause a test generation device to generate a test signal; and determine the structure of the low-voltage feeder based on a response to the test signal.

The switch control may be a relay.

The network protector also may include a sensor system configured to measure one or more electrical properties of electrical power on the low-voltage feeder.

The controller also may be configured to cause the switch control to open the resettable switching apparatus if a fault condition exists.

In another aspect, a method of operating a network protector includes: detecting reverse power flow from a load toward a source on a low-voltage electrical feeder of a secondary electrical distribution network; causing a test signal to be provided to the low-voltage electrical feeder of the secondary electrical distribution network; analyzing a response of the secondary electrical distribution system to the test signal; and determining whether to allow the reverse power to flow based on the analysis.

Implementations of any of the techniques described herein may a system, a network protector, a controller, a method, a process, or executable instructions stored on a machine-readable medium. The details of one or more implementations are set forth in the accompanying drawings and the description below. Other features will be apparent from the description and drawings, and from the claims.

DRAWING DESCRIPTION

DETAILED DESCRIPTION

Figure 1:
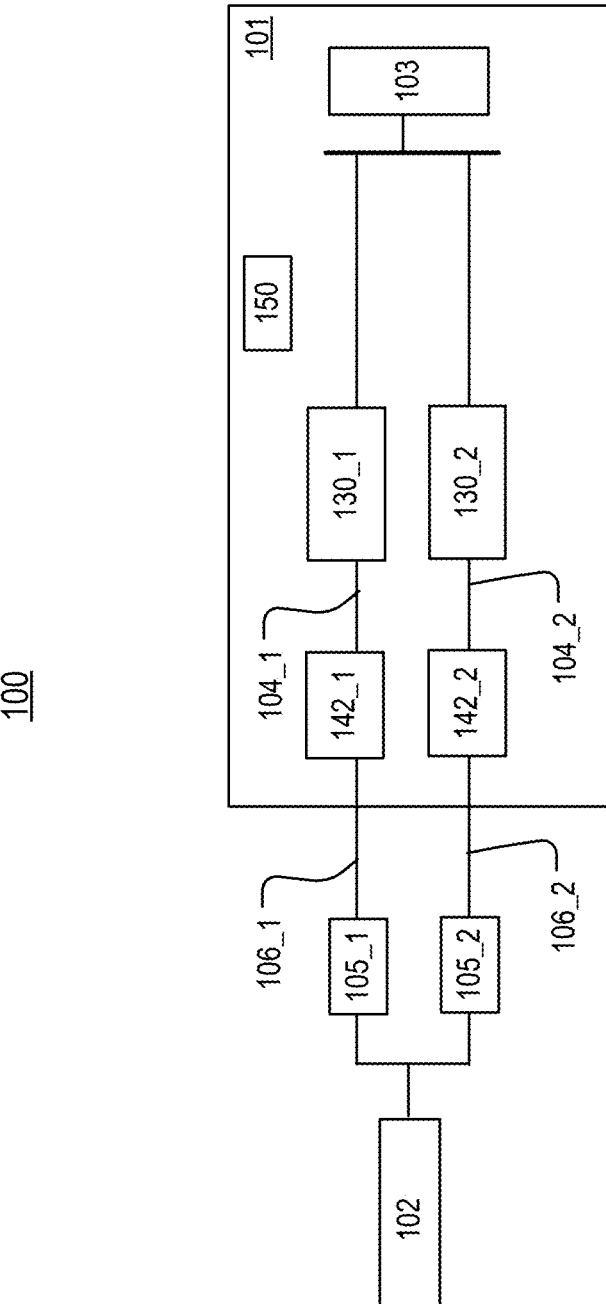
FIG. 1 is a block diagram of an example of an electrical power system.

FIG. 1 is a block diagram of an example of an electrical power system 100. The power system 100 may be a single-phase power system or a multi-phase (for example, three-phase) power system. A single phase is shown in FIG. 1 for simplicity. The electrical power system 100 includes a secondary electrical power distribution network 101 that includes switch devices 130_1 and 130_2. The switch devices 130_1 and 130_2 may be any type of switch that is capable of repeatedly controlling the electrical connection between the respective feeder 104_1 and 104_2 and the loads 103. For example, the switch devices 130_1 and 130_2 may be network protectors, reclosers, or switchgears. The secondary electrical power distribution network 101 is electrically connected to an alternating current (AC) source 102 and to load or loads 103. As discussed below, the switch devices 130_1 and 130_2 are configured to allow bi-directional power flow (power flow toward and away from the source 102) while also providing protection from abnormal conditions (such as fault conditions). The configuration allows the secondary distribution network 101 to provide electrical power generated by a distributed energy resource (DER) to the power system 100.

The AC power source 102 operates at a fundamental frequency of, for example, 50 or 60 Hertz (Hz). The power source 102 may be a generator, a power plant, an electrical substation, or a renewable energy source. The power source 102 may be medium-voltage or distribution voltage (for example, between 1 kilovolts (kV) and 35 kV) or high-voltage (for example, 35 kV and greater). Moreover, the power source 102 may receive power from other electrical power sources that are not shown in FIG. 1. For example, each of the power source 102 may be a medium-voltage substation that receives and transforms high-voltage AC power into medium-voltage AC power that is provided to feeders 106_1 and 106_2.

The feeders 106_1 and 106_2 transfer AC electrical power from the power source 102 to a primary or source side of respective distribution transformers 142_1 and 142_2. A distribution transformer is a transformer performs a voltage transformation at an end point or node of a distribution grid. In the example of FIG. 1, the distribution transformers 142_1 and 142_2 convert voltage on the respective feeders 106_1 and 106_2 to lower voltages that are suitable for general household, industrial, and/or commercial use. For example, the distribution transformers 142_1 and 142_2 may transform the voltage on the respective feeders 106_1 and 106_2 to a voltage of 1 kV or less. The secondary side of each distribution transformer 142_1, 142_2 is connected to a respective feeder 104_1, 104_2 of the secondary distribution network 101.

The network protector 130 1 controls an electrical connection between the distribution transformer 142_1 and loads 103. The network protector 130_2 controls an electrical connection between the distribution transformer 142 2 and the loads 103. The loads 103 include one or more distributed energy resources (DER). A DER is an electricity-producing resource and/or a controllable load. Examples of DER include, for example, solar-based energy sources such as, for example, solar panels and solar arrays; wind-based energy sources, such as, for example wind turbines and windmills; combined heat and power plants; rechargeable sources (such as batteries); natural gas-fueled generators; electric vehicles; and controllable loads, such as, for example, some heating, ventilation, air conditioning (HVAC) systems and electric water heaters. The loads 103 also may include devices and systems that are not DERs. For example, the loads 103 also may include motors, lighting systems, and/or machines. The secondary electrical distribution network 101 includes switch devices 130_1 and 130_2. The system 100 also includes a controller 150.

Under some conditions, the power generated by the DERs exceeds the power demand of the loads 103, and the DERs return electrical power to the secondary distribution system 101. This returned electrical power is reverse power that flows from the loads 103 toward the source 102. In a traditional configuration of an electrical distribution system, it is assumed that power flows from the source to the loads under expected or ordinary conditions, and that reverse power flow (for example, a current that flows from the loads to the source) is an indication of an abnormal condition, such as the presence of a fault. Switch devices that are configured in the traditional manner open based on detection of power flowing from the load to the source, even if the reverse flow does not arise from an abnormal operating condition. More-over, switch devices configured in the traditional manner only reclose when conditions in the system indicate that power flow from the sources to the load is guaranteed.

On the other hand, in the system 100, the controller 150 is configured to determine whether or not the distribution network 101 is in an abnormal condition by determining the structure of the distribution network 101. Under normal or expected operating conditions, source-side circuit breakers 105 1 and 105 2 are closed, and the distribution network 101 has a mesh or loop structure. During an abnormal operating condition, such as an overcurrent or overvoltage condition, at least one of the breakers 105_1, 105_2 is open, and the distribution network 101 has a radial structure. Thus, by determining whether or not the distribution network 101 has a radial structure, the controller 150 also determines whether the electrical distribution network 101 has an abnormal condition directly and without relying on an assumption that reverse power flow indicates a fault condition.

Various techniques for determining the structure of the distribution network 101 are discussed below. Regardless of the specific approach used to determine the structure of the distribution network 101, the configuration of the controller 150 results in improved performance of the system 100 and greater utility for the switch devices 130_1 and 130_2 as compared to the traditional approach of assuming that reverse power flow indicates an abnormal condition. For example, the structure-determination approach provided by the controller 150 allows power generated by DERs to flow toward the source 102 when the network 101 is operating under normal or expected operating conditions. In contrast, a traditional approach does not allow power to flow toward the source 102 under any conditions, even if the network 101 is operating under normal conditions and the reverse power flow is generated by DERs. On the other hand, by allowing reverse power to flow under some conditions, the structure-determination approach results in fewer outages for custom-ers and fewer unnecessary operations of the switch devices 130_1 and 130_2. Accordingly, the structure-determination approach improves the performance and efficiency of the system 100 and the switch devices 130_1 and 130_2 while also improving customer satisfaction. Moreover, allowing electrical power generated by the DERs to flow in the network 101 reduces waste and results in a more environ-mentally sound approach.

Additionally, the switch devices 130_1 and 130_2 and the controller 150 may be used in implementations in which the secondary distribution network 101 has a relatively high penetration of DER power generation, for example, a 90% or greater penetration. DER penetration is the ratio of nominal capacity of DER power generation to the nominal load of the feeder to which the DERs are connected. The likelihood of reverse power arising from DER power gen-eration occurring increases with DER penetration.

Prior to discussing the controller 150 in more detail, an overview of the distribution network 101 is provided.

The secondary electrical power distribution network 101 is a low-voltage network (for example, a network that distributes electricity having a voltage of 1 kV or less). The secondary electrical power distribution network 101 may be a spot network or an area network. In a spot network, two or more feeders are connected in parallel to a common bus to provide power to a specific location or spot. A grid or area network includes redundant feeders. Regardless of the con-figuration of the low-voltage network, the network protec-tors 130_1 and 130_2 improve the overall performance of the low-voltage network. For example, reverse power caused by DER generation exceeding the demand causes in a network protector with a traditional configuration to open, even if there is no fault condition. In a spot network that employs traditional network protectors, any reverse power causes the network protectors to open, which results in a service outage for the load. In an area or grid network that employs only traditional network protectors, the presence of reverse power may cause fewer than all network protectors to open, however, reliability is reduced when even some of the network protectors open. Thus, the network protectors 130_1 and 130_2, which do not assume that reverse power flow is caused by a fault condition, improve the performance of spot and area networks.

Figures 2, 3:
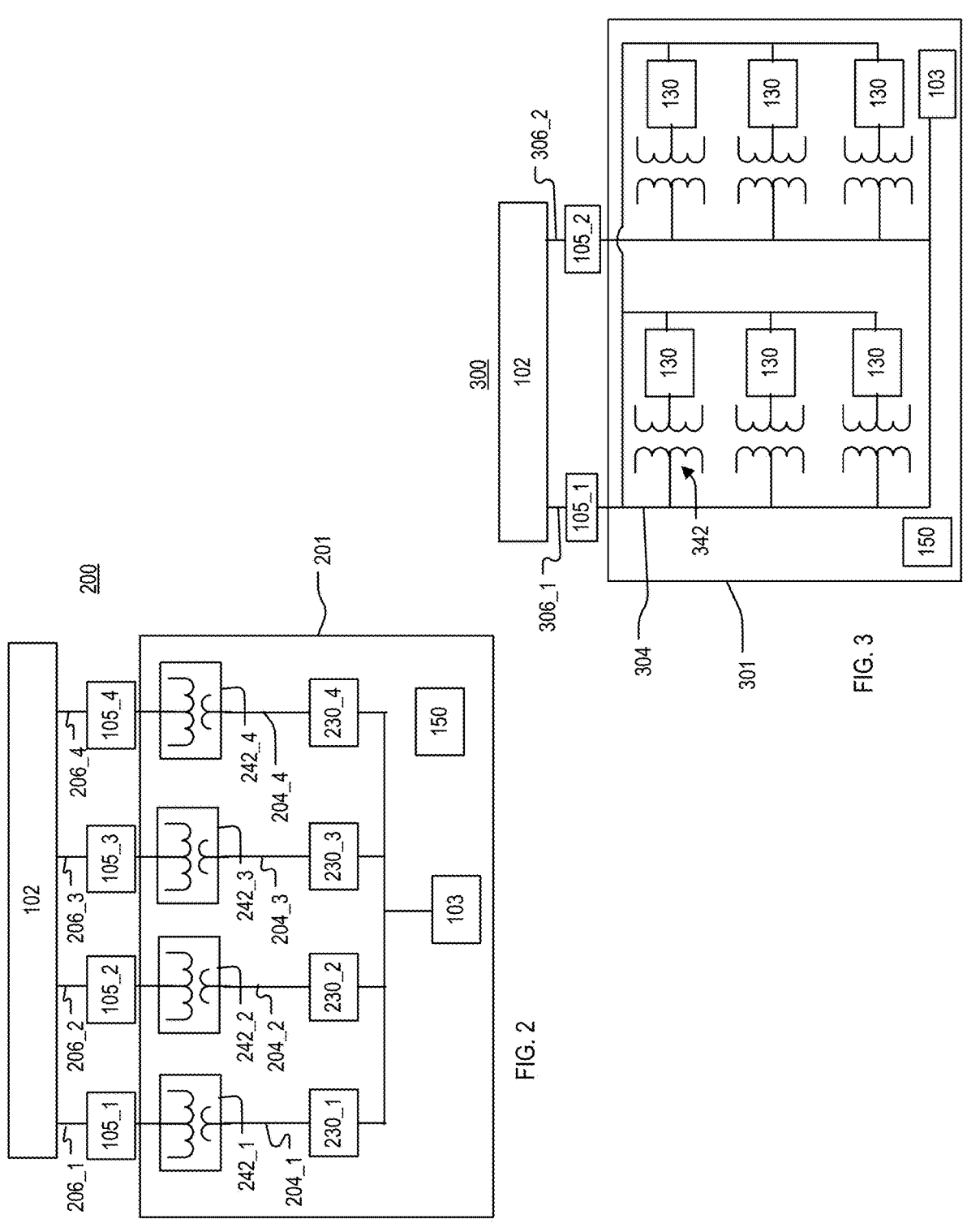
FIG. 2 is a block diagram of an example of a spot network.
FIG. 3 is a block diagram of an example of an area network.

FIG. 2 is a block diagram of an electrical power system 200 that includes a spot network 201. The spot network 201 includes four parallel low-voltage feeders 204_1, 204_2, 204_3, 204_4 that are all connected to a spot, which is the loads 103 in the example of FIG. 2. The loads 103 may be, for example, a variety of electrical loads that are all within one large building or location, such as an airport terminal, a data center, a hospital, or an apartment building. The spot network 201 includes one or more DERs. The loads 103 include one or more DERs.

The spot network 201 receives electrical power from four medium-voltage feeders 206_1, 206_2, 206_3, 206_4 that are fed by the AC power source 102. The feeders 206_1, 206_2, 206_3, 206_4 include respective circuit breakers 105_1, 105_2, 105_3, and 105_4 that open in the presence of an abnormal condition, such as a fault (for example, an over-voltage or over-current condition) or scheduled main-tenance.

Each medium-voltage feeder 206_1, 206_2, 203_3, 206_4 is electrically connected to a primary side of a respective distribution transformer 242_1, 242_3, 242_3, 242_4. The voltage at on each feeder 206_1, 206_2, 206_3, 206_4 and at the primary side of each respective distribution trans-former 242_1, 242_3, 242_3, 242_4 is determined by the voltage of the source 102. The distribution transformers 242_1, 242_3, 242_3, 242_4 step down (reduce) the voltage from the source 102 such that the voltage at a secondary side of each transformer is lower than the voltage at the primary side. The voltage at the primary side of the distribution transformers may be, for example, between 1 kV and 35 kV, and the voltage at the secondary side of the distribution transformers may be, for example, 240 V, 480 V, or 600 V.

The secondary side of each distribution transformer 242_1, 242_3, 242_3, 242_4 is electrically connected to a respective low-voltage feeder 204_1, 204_2, 204_3, 204_4. Respective switch devices 230_1, 230_2, 230_3, 230_4 control the electrical connection between the loads 103 and each low-voltage feeder 204_1, 204_2, 204_3, 204_4. The operation of the switch devices 230_1, 230_2, 230_3, 230_4 is controlled by the controller 150. Although the controller 150 is shown as a single element, in some implementations, each switch device 230_1, 230_2, 230_3, 230_4 has a dedicated local controller that controls the operations of that switch device. In these implementations, the spot network 201 includes four instances of the controller 150, and each instance of the controller is associated with one switch device. Each switch device 230_1, 230_2, 230_3, 230_4 may be, for example, a network protector. In implementations in which the switch devices 230_1, 230_2, 230_3, 230_4 are network protectors, each network protector may have a dedicated local controller.

FIG. 3 is a block diagram of a power system 300 that includes an area network 301. The area network 301 includes redundant feeders 304 (only one of which is labeled), switch devices 130 (each of which may be a network protector), and transformers 342 that provide power to the loads 103. The area network 301 may include tens of redundant feeders 304 and switch devices 130, and the loads 103 may include tens, hundreds, or thousands of loads. The switch devices 130 are controlled by the controller 150. Although the controller 150 is shown as a single element, in some implementations, each switch device 130 has a dedicated local controller.

FIGS. 1, 2, and 3 are provided as examples, and the controller 150 may be used with distribution networks having other configurations. For example, the distribution network 201 may have fewer or more than four parallel low-voltage feeders.

Figure 4:
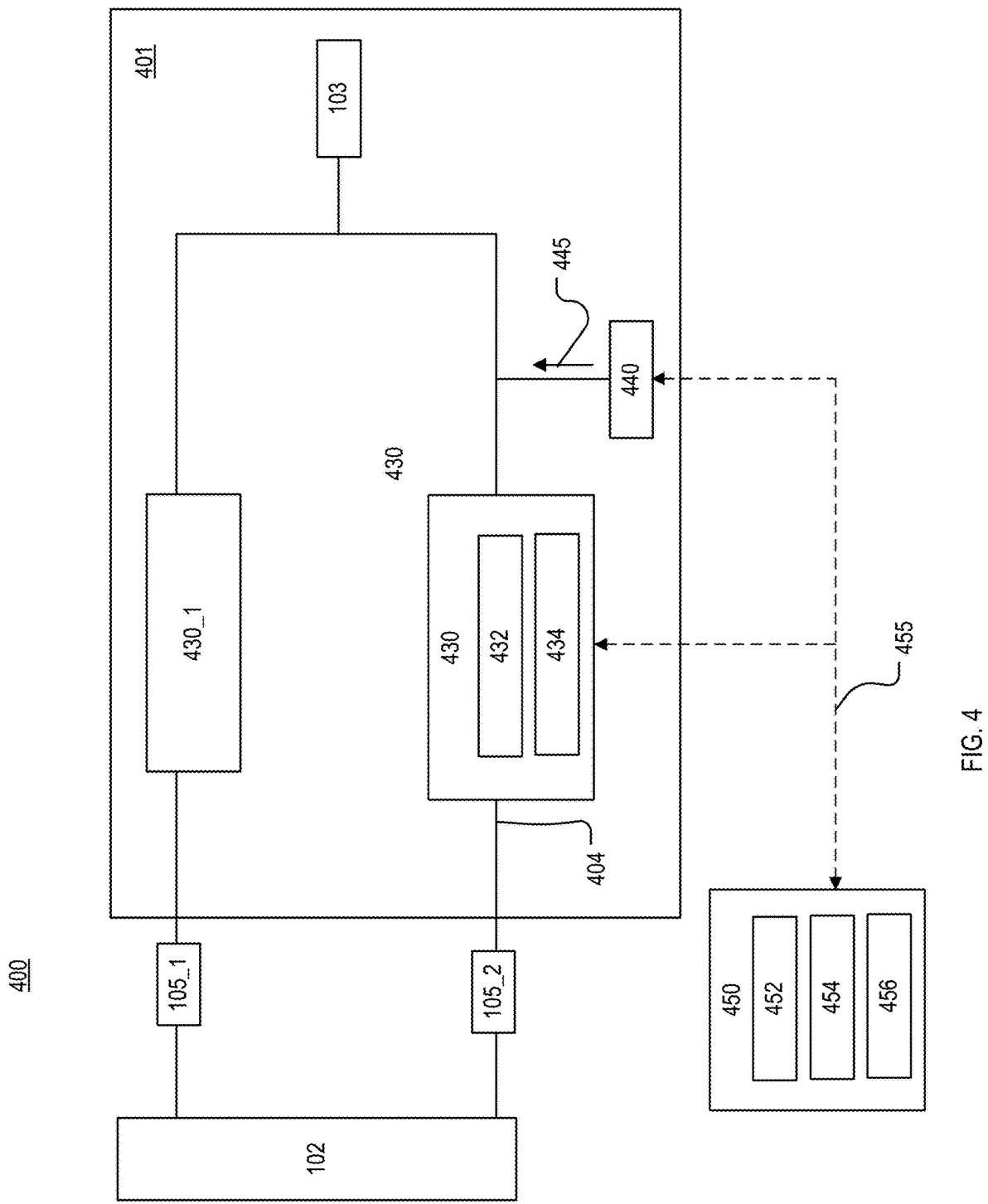
FIG. 4 is a block diagram of another example of an electrical power system.

FIG. 4 is a block diagram of a controller 450 in a power system 400 that includes a distribution network 401. The controller 450 is an example of an implementation of the controller 150. The distribution network 401 may be a medium-voltage distribution network or a low-voltage secondary distribution network. The distribution network 401 includes a plurality of feeders. In the example of FIG. 4, two feeders are shown and one is labeled as feeder 404. A switch device 430 is coupled to the feeder 404. The distribution network 401 includes additional switch devices 430 coupled to the other feeders. In the example of FIG. 4, an additional switch device is labeled as 430_1.

The switch device 430 may be a single-phase or multi-phase switch device. The switch device 430 includes a resettable switching apparatus 432 and a sensing system 434. The switch device 430 is coupled to the controller 450. The controller 450 is shown as being separate from the switch device 430. However, in some implementations, the controller 450 is included in the switch device 430. For example, the controller 450 and the switch device 430 may be contained together in the same housing. The switch device 430 is electrically connected to the feeder 404.

The resettable switching apparatus 432 is any type of switch that is capable of opening and closing the feeder 404. The resettable switching apparatus 432 is configured for repeated operation. For example, after the resettable switching apparatus 432 opens the feeder 404 to stop or prevent current flow, the resettable switching apparatus 432 is able to close the feeder 404 such that current flow in the feeder 404 resumes. The resettable switching apparatus 432 also may include additional components and systems such as actuators, motors, springs, levers, and/or driving electronics that facilitate the operation of the switching apparatus 432.

In some implementations, the feeder 404 is a high-voltage or medium-voltage feeder, and the switch device 430 is configured to open and close such a feeder. For example, the switch device 430 may be a switchgear or a recloser. In these implementations, the resettable switching apparatus 432 may be a plurality of electrically conductive contacts that are joined to close the feeder 404 and separated to open the feeder 404. For example, the resettable switching apparatus 432 may include a first electrical contact and a second electrical contact configured to move relative to the first electrical contact to open and close the feeder 404. The resettable switching apparatus 432 may be a vacuum interrupter or a high-voltage or medium voltage circuit breaker.

In some implementations, the feeder 404 is a low-voltage feeder that is in a secondary electrical distribution network. In these implementations, the switch device 430 may be, for example, a network protector or other switch device configured for low-voltage use. In implementations in which the switch device 430 is a network protector, the resettable switching apparatus 432 may be an air circuit breaker operated by relay that monitors the voltage across the open contacts and the current through the closed contacts. An air circuit breaker includes two electrical contacts that operate in air at atmospheric pressure. When the electrical contacts are joined, current can flow in the feeder 404. When the electrical contacts are separated, current cannot flow in the feeder 404.

The switch device 430 also includes a sensing system 434. The sensing system 434 includes one or more detectors or sensors, each of which is configured to sense one or more properties of the electrical current in the feeder 404. The sensing system 434 may include any type of current sensor, such as, for example, a current transformer (CT) or a Rogowski coil. Alternately or additionally, the sensing system 434 may include one or more voltage sensors and/or one or more power sensors. The sensing system 434 may include a relay.

The switch device 430 also includes a controller 450. The controller 450 is coupled to the switch device 430 and to a test generation device 440 via a communication path 455. The communication path 455 may be any type of wired and/or wireless path capable of transporting signals, information, and/or data. For example, the communication path 455 may be a control cable, a wire, and/or an Ethernet or other network cable.

Figures 5A, 5B, 5C:
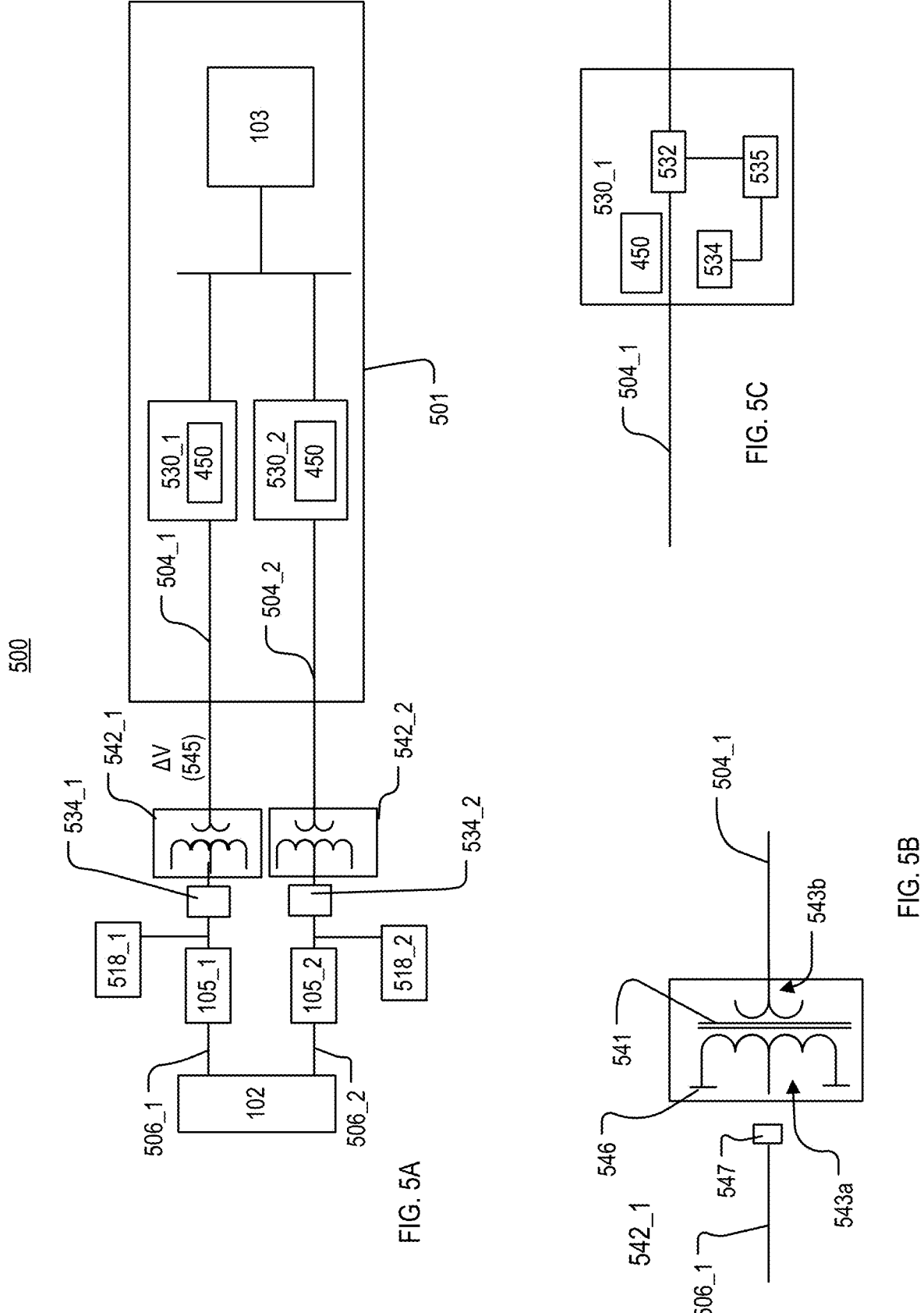
FIG. 5A is a block diagram of another example of an electrical power system.
FIG. 5B is a block diagram of an example of a distribution transformer.
FIG. 5C is a block diagram of an example of a network protector.
Figure 6A:
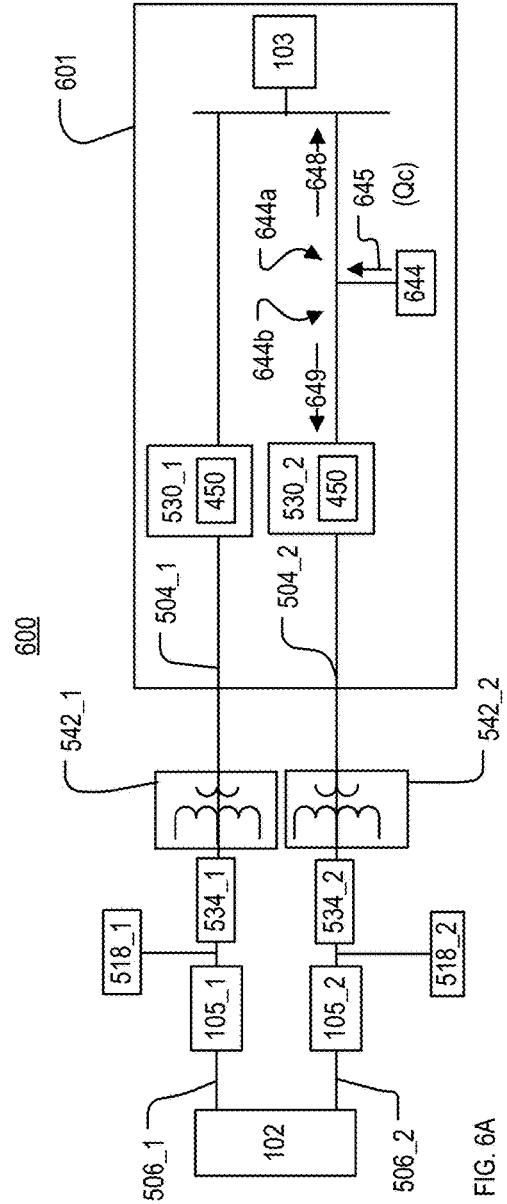
FIGS. 6A and 6B are block diagrams of another example of an electrical power system.
Figure 6B:
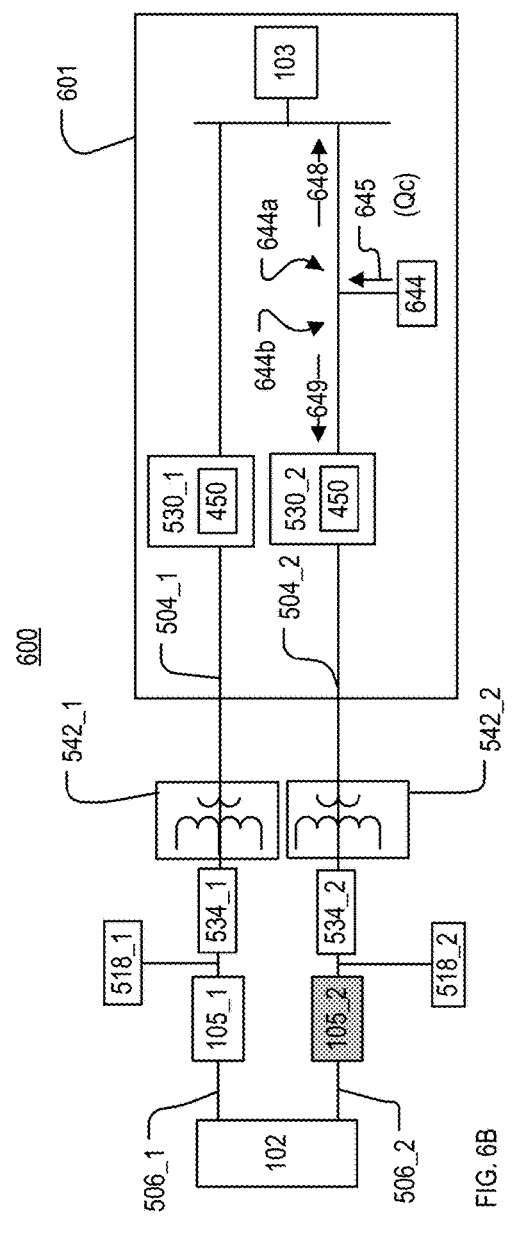

The test generation device 440 may be, for example, a device capable of injecting reactive power, such as the reactive power generation apparatus 644 of FIGS. 6A and 6B, or a device capable of changing the amount of voltage on the feeder 404, such as the distribution transformer 542_1 of FIG. 5A, a voltage regulator, or any other device or apparatus that includes a tap changer. The power generation apparatus 644 may be, for example, a capacitor bank, power electronic switches, a power converter, and/or an inverter. The test generation device 440 is electrically connected to the feeder 404, however, the test generation device 440 is not necessarily connected between the switch device 430 and the loads 103 as shown in FIG. 4. Moreover, although the test generation device 440 is shown as being distinct from the switch device 430, in some implementations, the test generation device 440 is integrated with the switch device 430. For example, the test generation device 440 may be housed within a unit or container that also houses the resettable switching apparatus 432.

The controller 450 is an electronic controller that includes an electronic processing module 452, an electronic storage 454, and an input/output (I/O) interface 456. The electronic processing module 452 includes one or more electronic processors, each of which may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 454 may be any type of electronic memory that is capable of storing data and instructions in the form of computer programs or software, and the electronic storage 454 may include volatile and/or non-volatile components. The electronic storage 454 and the processing module 452 are coupled such that the processing module 452 can access or read data from and write data to the electronic storage 454.

The electronic storage 454 stores executable instructions, for example, as a computer program, logic, or software, that cause the processing module 452 to perform various operations. For example, the electronic storage 454 stores executable instructions that cause the processing module 452 to determine the structure of the distribution network 401 using the process 700 of FIG. 7. To provide another example, the electronic storage may store instructions that cause readings from the sensing system 434 to be stored on the electronic storage 454. The instructions also may include instructions that compare the readings obtained by the sensing system 434 at different times to determine whether one or more properties of the electrical power in the feeder 404 change over time. The properties include, for example, the direction of current flow on the feeder 404, magnitude of voltage on the feeder 404, phase angle of voltage on the feeder 404, magnitude of current on the feeder 404, phase angle of current on the feeder 404, active power on the feeder 404, reactive power on the feeder 404, or impedance at a known point on the feeder 404.

The electronic storage 454 also may store information about the switch device 430 and/or the feeder 404, such as one or more threshold values used for determining whether a change has occurred in one or more measured properties. For example, as discussed above, the electronic storage 454 may store instructions that determine whether one or more measured properties on the feeder 404 changes over time. In this example, if the magnitude of the measured voltage on the feeder 404 changes by at least the voltage change threshold over the associated time, the controller 450 produces an indication that the voltage magnitude has changed. Thresholds for other properties also may be stored on the electronic storage 454. Moreover, the threshold may be expressed as a percentage change that is stored on the electronic storage 454. The same percentage change may be used as a threshold for all measured properties, or each measured property may have a different threshold. In some implementations, threshold values or threshold percentage changes may be entered into the controller 450 via the I/O interface 456.

Furthermore, the electronic storage 454 may store instructions that, when executed, cause the electronic processing module 452 to send the test generation device 440 a command signal that causes the test generation device 440 to generate a test signal 445 and provide the test signal 445 to the feeder 404. The electronic storage 454 also may store instructions that cause the electronic processing module 452 to analyze values of one or more properties of electrical power on the feeder 404 and/or in a power system that includes the feeder 404 after controlling the test generation device 440.

Furthermore, the electronic storage 454 may include instructions that implement techniques for filtering and/or preparing the data produced by the sensing system 434. For example, the electronic storage 454 may include instructions that implement an analog-to-digital (A/D) converter that digitizes analog data from the sensing system 434.

Additionally, the electronic storage 454 may store instructions related to the operation of the switch device 430. For example, the electronic storage 454 may store instructions, that when executed by the processing module 452, cause the controller 450 to issue a command to the switch device 430 such that the switch device 430 opens or closes. Moreover, the electronic storage 454 may store information related to the conditions under which the switch device 430 is to be opened or closed. For example, the electronic storage 454 may store a threshold value that represents a maximum acceptable difference between the network-side and source-side voltage vectors to allow the switch device 430 to transition from the open state to the closed state, as discussed with respect to FIG. 8.

The I/O interface 456 may be any interface that allows a human operator and/or an autonomous process to interact with the controller 450. The I/O interface 456 may include, for example, a display (such as a liquid crystal display (LCD)), a keyboard, audio input and/or output (such as speakers and/or a microphone), visual output (such as lights, light emitting diodes (LED)) that are in addition to or instead of the display, serial or parallel port, a Universal Serial Bus (USB) connection, and/or any type of network interface, such as, for example, Ethernet. The I/O interface 456 also may allow communication without physical contact through, for example, an IEEE 802.11, Bluetooth, or a near-field communication (NFC) connection. The controller 450 may be, for example, operated, configured, modified, or updated through the I/O interface 456.

The I/O interface 456 also may allow the controller 450 to communicate with systems external to and remote from the switch device 430. For example, the I/O interface 456 may include a communications interface that allows communication between the controller 450 and a remote station (not shown), or between the controller 450 and a separate electrical apparatus in the power system 100 (FIG. 1) using, for example, the Supervisory Control and Data Acquisition (SCADA) protocol or another services protocol, such as Secure Shell (SSH) or the Hypertext Transfer Protocol (HTTP). The remote station may be any type of station through which an operator is able to communicate with the controller 450 without making physical contact with the switch device 430 or the controller 450. For example, the remote station may be a computer-based work station, a smart phone, tablet, or a laptop computer that connects to the controller 450 via a services protocol, or a remote control that connects to the controller 450 via a radio-frequency signal. The controller 450 may communicate information such as the determined tap position through the I/O interface 456 to the remote station or to a separate device in the power system 400.

As discussed above, the test generation device 440 may be a reactive power generation apparatus or a distribution transformer. FIG. 5A shows an example that includes distribution transformers 542_1 and 542_2. FIGS. 6A and 6B shows an example that includes a reactive power generation apparatus 644.

FIG. 5A is a block diagram of a power system 500. The power system 500 includes distribution network 501. In the example of FIG. 5A, the distribution network 501 is a low-voltage secondary distribution network that includes low-voltage feeders 504_1 and 504_2. The distribution network 501 includes a first medium-voltage feeder 506_1 and a second medium-voltage feeder 506 2 that are feed by the source 102. The first and second medium-voltage feeders 506_1 and 506_2 include respective circuit breakers 105_1 and 105_2. The system 500 also includes medium-voltage loads 518_1 and 518_2, which are respectively connected to the medium-voltage feeders 506_1 and 506_2.

The power system 500 also includes network protectors 530_1 and 530_2. The network protector 530 1 controls an electrical connection between the low-voltage feeder 504_1 and the loads 103. The network protector 530_2 controls an electrical connection between the low-voltage feeder 504_2 and the loads 103. Each network protector 530_1 and 530_2 includes an instance of the controller 450.

FIG. 5C is a block diagram of the network protector 530_1. The network protector 530_1 includes a resettable switching apparatus 532, a sensor system 534, and a relay or switch control 535. The resettable switching apparatus 532 may be, for example, an air circuit breaker.

The sensing system 534 is configured to measure voltage and/or current in the respective low-voltage feeder 504_1. The sensing system 534 may include, for example, a current sensor that measures current in the low-voltage feeder 504_1, a first voltage sensor that measures voltage between the source side of the network protector 530_1 and the load side of the network protector 530_1, and a second voltage sensor that measures voltage between the low-voltage feeder 504_1 and ground or other reference potential. The relay 535 controls the state of the switching apparatus 532 based on measurements from the sensing system 534. The network protector 530_2 is configured in the same manner. Any type of sensor capable of measuring voltage and/or current may be used in the sensing system 534. The current sensor may be, for example, a current transformer (CT) or Rogowski coil. The voltage sensor may be, for example, a potential transformer (PT).

The system 500 also includes distribution transformers 542_1 and 542_2, which are substantially identical to each other. FIG. 5B shows the distribution transformer 542_1 in greater detail. The transformer 542_1 includes a primary winding 543a and a secondary winding 543b that are magnetically coupled by a core 541. The primary winding 543a and the secondary winding 543b are made of an electrically conductive material such as, a metal or a metal alloy, for example, copper or a copper alloy. The primary winding 543a is on a primary or source side of the transformer 542_1, and the secondary winding 543b is on a secondary side of the transformer 542_1.

The core 541 is made of a ferromagnetic material, such as, for example, iron or steel. The core 541 may be a gapped core or an un-gapped core. In implementations in which the core 541 is an un-gapped core, the core 541 is a contiguous segment of ferromagnetic material. A gapped core includes a gap that is not ferromagnetic material. The gap may be, for example, air, nylon, or any other material that is not ferromagnetic. Thus, in implementations in which the core 541 is a gapped core, the core includes at least one segment of a ferromagnetic material and at least one segment of a material that is not a ferromagnetic material.

Referring also to FIG. 5B, the primary winding 543a includes T taps 546, where T is an integer number that is greater than one. The taps 546 are made of an electrically conductive material (such as, for example, metal), and the taps 546 are electrically connected to the primary winding 543a. Each tap is separated from the nearest other tap, with at least one turn being between any two adjacent taps. During operational use of the distribution transformer 542_1, there is a potential difference V_T between any two adjacent taps 546.

The medium-voltage feeder 506_1 is electrically connected to a tap selector 547. The tap selector 547 is made from an electrically conductive material and is configured to electrically connect the medium-voltage feeder 506_1 to one of the taps 546. The amount of voltage provided to the low-voltage feeder 504_1 depends on which of the taps 546 the tap selector 547 is connected to, thus, the controller 450 is able to change the voltage on the low-voltage distribution feeder 504_1 by a known amount by moving the tap selector 547 from one of the taps 546 to another one of the taps 546.

The controller 450 in each network protector 530_1 and 530_2 receives data from respective source-side monitors 534_1 and 534_2. The source-side monitors 534_1 and 534_2 may be sensors that are configured to measure, for example, the voltage and/or other electrical properties on the primary side of the transformers 542_1 and 542_2. In some implementations, the source-side monitors 534_1 and 534_2 are part of the respective transformers 542_1 and 542 2.

During normal operation of the power system 500, the medium-voltage circuit breakers 105_1 and 105_2 are closed, and the feeders 504_1 and 504_2 of the secondary distribution network 501 form a mesh or loop structure. The voltage at the primary side of the transformers 542_1 and 542_2 is dictated by the sources 102_1 and 102_2, respectively. Performing a tap change operation by moving the tap selector 547 to another tap does not change the voltage at the primary side of the transformers 542_1 and 542_2.

During abnormal operating conditions, the circuit breaker 105_1 or 105_2 opens, for example, due to a fault or scheduled maintenance, and the secondary distribution network 501 has a radial structure. When the secondary distribution network 501 has a radial structure, the voltage at the primary side of the transformers 542_1 and 542_2 depends on the voltage drop due to the loading on the secondary side. Thus, under an abnormal condition, a tap change operation changes the voltage on the primary side of the transformers 542_1 and 542_2. In the implementation shown in FIG. 5A, the source-side monitors 534_1 and 534_2 are used to monitor the voltage on the primary side of the respective transformers 542_1 and 542_2.

By performing a tap change operation and then monitoring the response to that tap change operation, the controller 450 is able to determine whether or not an abnormal condition exists in the distribution network 501. Moreover, the controller 450 may determine that the distribution network 501 is operating in an expected or normal condition even if there is reverse power flow on the feeder 504_1 and/or the feeder 504_2.

In some implementations, the controller 450 monitors one or more properties or parameters of electrical power in the feeder 504_1. A significant change in one or more of the monitored properties or parameters triggers the controller 450 to issue a tap change test command to the distribution transformer 542_1 to perform a tap change operation to generate a test signal 545. The voltage at the primary side of the distribution transformer 542_1 is analyzed based on data from the source-side monitor 534_1. If the voltage at the primary side of the distribution transformer 542_1 changes, the controller 450 determines that the feeder 504_1 has a radial structure and thus is in an abnormal condition. The controller 450 issues a command that causes the network protector 530_1 to open such that the feeder 504_1 is disconnected from the loads 103. If the voltage at the primary side of the distribution transformer 542_2 does not change, the feeder 504_1 has a mesh structure and is in a normal or expected operating condition. The network protector 530_1 remains closed.

The feeder 504_2 (and any other feeders in the distribution network 501) may be monitored and analyzed in the same manner. Moreover, in some implementations, the controllers 450 also control the reclosing, or closing after opening, of the network protector 530_1 and 530_2 using, for example, the process 800 discussed with respect to FIG. 8.

FIG. 6A is a block diagram of a power system 600. The power system 600 is similar to the power system 500 (FIG. 5A), except the power system 600 also includes a reactive power generation apparatus 644. The reactive power generation apparatus 644 may be any device or system that is capable of producing a test signal 645 that has a known amount of reactive power (Qc). Reactive power is the product of the voltage and current that is out-of-phase with each other. For example, the reactive power generation apparatus 644 may be a capacitor bank, an inductor bank, a bank of devices that includes inductors and capacitors, a power converter, or an inverter. The reactive power generation apparatus 644 is coupled to the controller 450 and is configured to be controlled by the controller 450. For example, the controller 450 may be configured to generate command signals that cause the reactive power generation apparatus 644 to inject the test signal 645 into the distribution network 601.

In the example shown in FIG. 6A, the reactive power generation apparatus 644 is electrically connected to the low-voltage feeder 504_2 between the loads 103 and the network protector 530_2. However, other implementations are possible. For example, the reactive power generation apparatus 644 may be between the distribution transformer 542_1 and the network protector 530_1. In another example, the reactive power generation apparatus 644 may be integrated with the network protector 530_2. Furthermore, the system 600 also may include an additional reactive power generation apparatus connected to the low-voltage feeder 504_1.

As discussed below, the test signal 645 is observed on a first side 644a and/or a second side 644b of the reactive power generation apparatus 644 to determine the structure of the distribution network 601.

FIG. 6A shows the power system 600 during normal or expected operating conditions. During normal and expected operation of the power system 600, the circuit breakers 105_1 and 105_2 are closed, the feeders 504_1 and 504_2 of the secondary distribution network 601 form a mesh or loop structure and, based on Kirchoff's Current Law (KCL), the reactive power (Qc) in the test signal 645 is divided into a first reactive power 648 that flows toward the loads 103 and a second reactive power 649 that flows toward the transformer 542_2. Under normal or expected operating conditions, the amount of reactive power in 648 and 649 depends on the impedance of the path toward the loads 103 and the path toward the transformer 542_2, respectively.

FIG. 6B shows the power system 600 during an abnormal condition after the circuit breaker 105_2 has opened due to, for example, a fault or scheduled maintenance. In FIG. 6B, the circuit breaker 105_2 is in grey shading to indicate that it is open. The circuit breaker 105_1 remains closed, and the source 102 remains connected to the feeder 506_1. During abnormal conditions, the network 601 has a radial structure. According to Kirchoff's Current Law (KCL), in a radial structure, the injected reactive power Qc becomes the source of reactive power on the second side 644b of the reactive power generation apparatus 644. Therefore, during abnormal conditions, the reactive power flow 649 on the second side 644b of the reactive power generation apparatus 644 remains constant before and after the injection of the test signal 645, while the reactive power flow 648 on the source side of the reactive power generation apparatus 644 (the first side 644a in the example of FIG. 6B) changes by Qc, which is the amount of reactive power in the test signal 645.

Thus, to determine the structure of the distribution network 601, the reactive power is observed on the first side 644a and/or the second side 644b of the reactive power generation apparatus 644 before and after injection of the test signal 645. For example, if the reactive power 648 on the source side of the reactive power generation apparatus 644 (the first side 644a in the example of FIG. 6B) changes by Qc after injection of the test signal 645, the distribution network 601 has a radial structure. If the reactive power 648 on the source side of the reactive power generation apparatus 644 does not change by Qc after the injection of the test signal 645, the distribution network 601 has a mesh or loop structure. Alternatively or additionally, the reactive power 649 on the second side 644b of the reactive power generation apparatus 644 may be observed before and after the injection of the test signal 645. If the reactive power 649 does not change, the distribution network 601 has a radial structure. If the reactive power 649 changes, the distribution network 601 has a mesh or loop structure. The reactive power on either side 644a, 644b of the reactive power generation apparatus 644 may be measured by the sensing system 534 or by a separate sensor (not shown).

In some implementations, the controller 450 monitors one or more properties or parameters of the electrical power in the feeder 504_1. A significant change in at least one of the monitored properties or parameters triggers the controller 450 to issue a command to the reactive power generation apparatus 644, and the test signal 645 is generated and injected into the feeder 504_2. Furthermore, if the controller 450 determines that the network 601 has a radial structure, the controller 450 opens the network protector 530_2. Such an implementation is discussed below with respect to FIG. 7. Moreover, in some implementations, the controllers 450 also control the reclosing, or closing after opening, of the network protectors 530_1 and 530_2 using a process such as the process 800 discussed with respect to FIG. 8.

Figure 7:
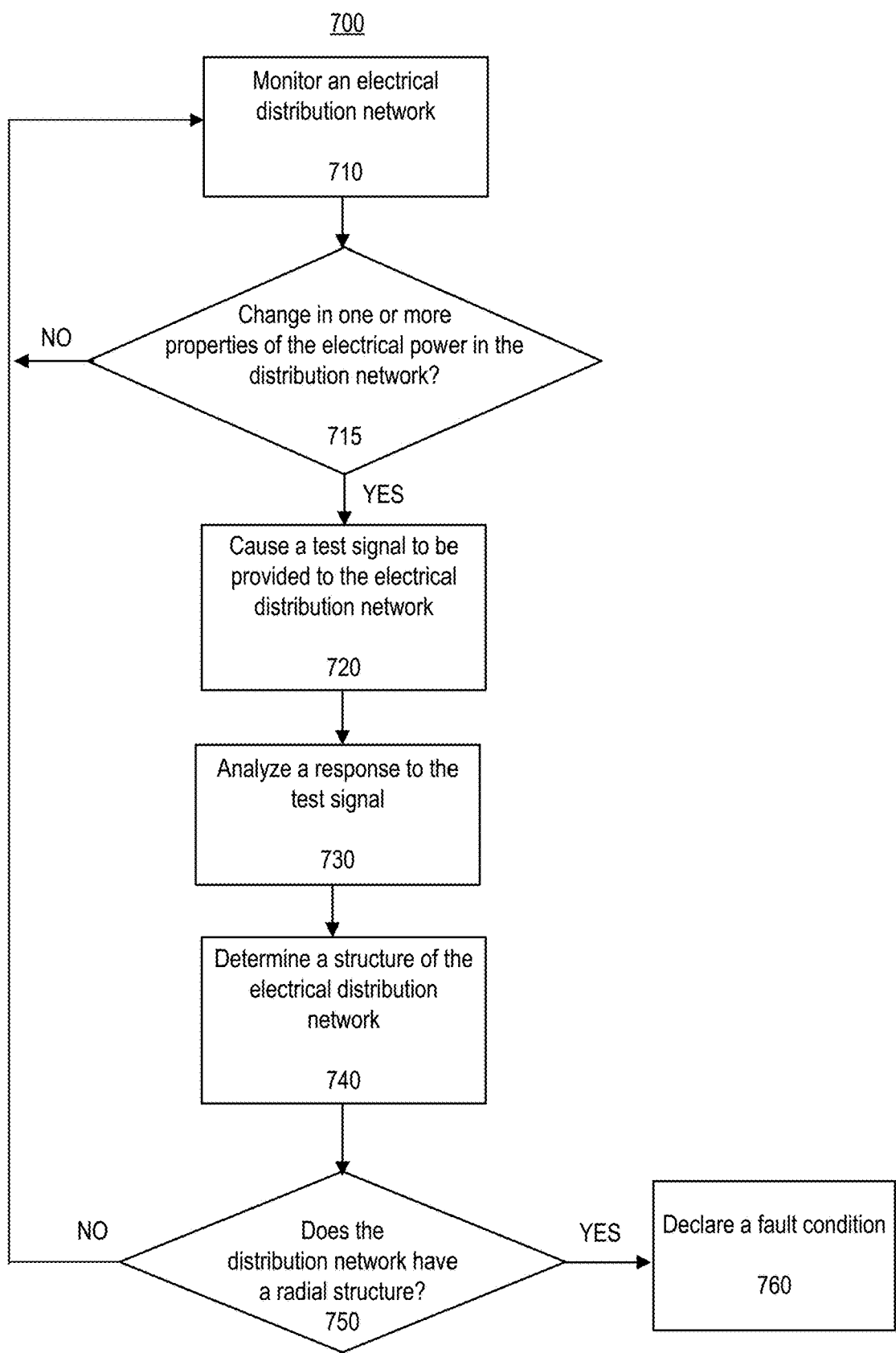
FIG. 7 is a flow chart of an example of a process for determining the structure of a distribution network.

FIG. 7 is a flow chart of a process 700. The process 700 is an example of a process for determining the structure of a distribution network. The process 700 may be used to determine the structure of any of the distribution networks 101, 201, 301, 401, 501, and 601 discussed above. Moreover, the process 700 may be used to determine the structure of other distribution networks. The process 700 may be performed by the controller 150 or the controller 450. The process 700 is discussed with respect to FIG. 4 for the purposes of providing an example.

The distribution network 401 is monitored (710). For example, and referring to FIG. 4, the sensing system 434 continuously monitors properties and parameters of the voltage and/or current on the feeder 404 and the measured data is stored on the electronic storage 454.

Whether or not a change in one or more monitored properties of the electricity in the network 401 is determined (715). The electronic storage 454 includes executable instructions that compare the measured data over time to determine whether one or more properties of the power flow in the feeder 404 has changed over a particular time period. The time period may be, for example, 1 millisecond (ms) to 10 seconds (s). The properties may be any measured or derived property and include, without limitation, amplitude and/or phase angle of voltage and/or current, reactive power, impedance, active power, impedance, and/or current flow direction.

To provide a specific example, the sensing system 434 may be configured to measure the magnitude of current flow in the feeder 404 every 5 ms, and the controller 450 may be configured to determine the amount of change between each measurement or between every other measurement. In this way, the controller 450 determines the amount of change in the measured current magnitude over a specified time period. The controller 450 compares the determined amount of change to a threshold related to that property. Continuing the example of current magnitude, the controller 450 is configured to compare the change in the current magnitude to a pre-determined current magnitude threshold.

To provide another example, the property may be the direction of current flow on the feeder 404. A change in direction is considered a change in a property, but is not assumed by the controller 450 to necessarily indicate the presence of an abnormal condition. Moreover, the electronic storage 454 may store a threshold or a specification related to the current direction property. For example, the threshold may specify a period of time over which the direction is reverse (toward the source) before the direction of current flow is determined to have changed.

If none of the changes exceed a threshold, there has not been a change in one or more properties at (715), the process 700 returns to (710) and continues to monitor the feeder 404.

If the change exceeds the threshold, then the controller 450 determines that there has been a change in an electrical property, and the process 700 moves to (720). In some implementations, the controller 450 only detects that a change in an electrical property has occurred if the amount of change of more than one property exceeds the appropriate threshold for that property.

The controller 450 causes the test generation device 440 to generate the test signal 445, which is provided to the feeder 404 (720). In implementations in which the test generation device 440 is a distribution transformer (such as shown in FIG. 5A), the controller 450 causes the tap selector 547 to move to a different one of the taps 546. In implementations in which the test generation device 440 is a reactive power generation apparatus (such as shown in FIGS. 6A and 6B), the controller 450 causes the reactive power generation apparatus 644 to generate the test signal 645 by providing a known amount of reactive power to the feeder 404.

In some implementations, the controller 450 causes the test signal to be produced without performing (710) and (715). For example, an operator of the system 400 may manually trigger the generation of the test signal 445 by communicating with the controller 450 through the I/O interface 456. In other words, the process 700 may be performed without performing (710) and (720), and the generation of the test signal 445 may be triggered by events other than a change in a monitored electrical property.

After providing the test signal 445 to the feeder 404, the controller 450 analyzes the response to the test signal 445 (730). For example, if the test signal is the reactive power test signal 645 (FIGS. 6A and 6B), the controller 450 determines whether the reactive power on a side of the reactive power generation apparatus 644 changes after the reactive power test signal 645 is injected. In another example, if the test signal is the tap change voltage 545, the controller 450 determines whether the voltage on the primary side of the transformer 542_1 changes after the tap change occurs.

The controller 450 determines the structure of the electrical distribution network 401 (740). The analysis for determining the structure of the distribution networks 501 and 601 discussed above with respect to FIGS. 5A, 6A, and 6B are additional examples of (740).

If the distribution network 401 has a radial structure (750), the controller 450 declares a fault (760). The controller 450 may declare a fault by producing a perceivable indicator at the I/O interface 256. The controller 450 also issues a command signal to the switch device 430 that causes the switch device 430 to open to thereby disconnect the feeder 404 from the loads 103. For example, in the abnormal condition shown in FIG. 6B, the controller 450 would control the network protector 530_2 to open after determining that a radial structure existed.

If the distribution network 401 does not have a radial structure (750), then the switch device 430 remains closed and the feeder 404. The process 700 may end or return to (710) to continue monitoring the feeder 404.

Figure 8:
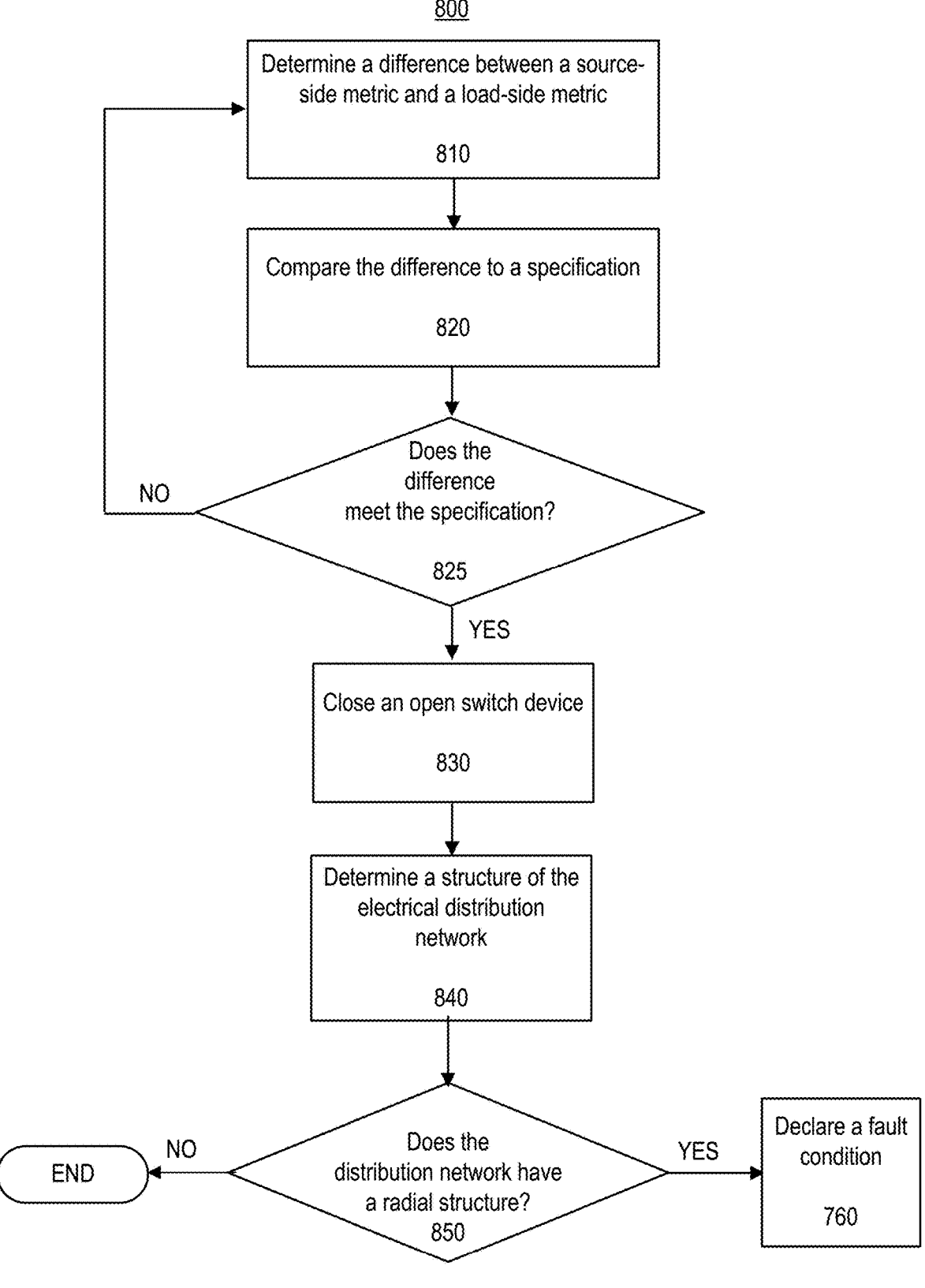
FIG. 8 is a flow chart of an example of a process for reclosing or closing an open switch device.

FIG. 8 is a flow chart of a process 800. The process 800 is an example of a process for reclosing or closing an open switch device. The process 800 may be performed by the controller 150 or the controller 450 and with any of the switch devices discussed above. To provide an example, the process 800 is discussed with respect to reclosing the network protector 530_2 of FIG. 6B. As discussed above, FIG. 6B illustrates an abnormal condition. The network protector 530_2 is opened after determining that the network 601 has a radial structure.

As noted above, in traditional network protectors, forward power flow (from source to load) is typically a required condition to reclosing a switch device. However, the configuration of the controller 450 allows reclosing even in the presence of reverse flow. In other words, forward power flow is not required for reclosing the network protector 530_2. The controller 450 first checks the distribution transformer 542_2 to determine whether or not it is energized and the loads 103 to determine whether or not the loads 103 have voltage. If the distribution transformer 542_2 is energized and the loads 103 have voltage, the controller 450 determines a magnitude of a difference (Vtn) between a voltage vector (Vt) on the primary side of the transformer 542_2 and a voltage vector (Vn) on the network side of the transformer 542_2 (810), and determines if the magnitude of the difference is within an acceptable limit (820) according to Equation 1:

$$|Vtn| < threshold \qquad \text{Equation (1)},$$

where Vtn=Vt−Vn, and threshold is the maximum allowable difference between the voltage vectors Vt and Vn. The threshold may be stored on the electronic storage 454 or provided through the I/O interface 456. The threshold value is a numerical value and may be, for example, 135 V.

If the magnitude of the voltage difference is greater than the threshold (825), the network protector 530_2 is not closed, and the process 800 returns to (810).

If the magnitude of the voltage difference is less than the threshold (825), the controller 450 issues a close command to the network protector 530_2 (830), and the reclose action is performed. The reclose action may take, for example, 1 minute, 2 minutes, or 5 minutes.

After the reclose action is complete, the controller 450 may issue a command to the reactive power generation apparatus 644 to issue the test signal 645 (840). The controller 450 may then analyze the response to the test signal 645 as discussed above to confirm that the feeder 504_2 and the distribution network 601 are in the loop or mesh configuration. If the distribution network 601 has the loop or mesh structure, the process 800 ends or enters (710) of the process 700 to begin monitoring for an abnormal condition. If the distribution network 601 has a radial structure, the controller 450 declares a fault condition (760). Other network protectors in the distribution network 601 may be reclosed in the same manner. Furthermore, the process 800 may be used to reclose switch devices in any of the distribution networks 101, 201, 301, 401, and 501.

Figure 9:
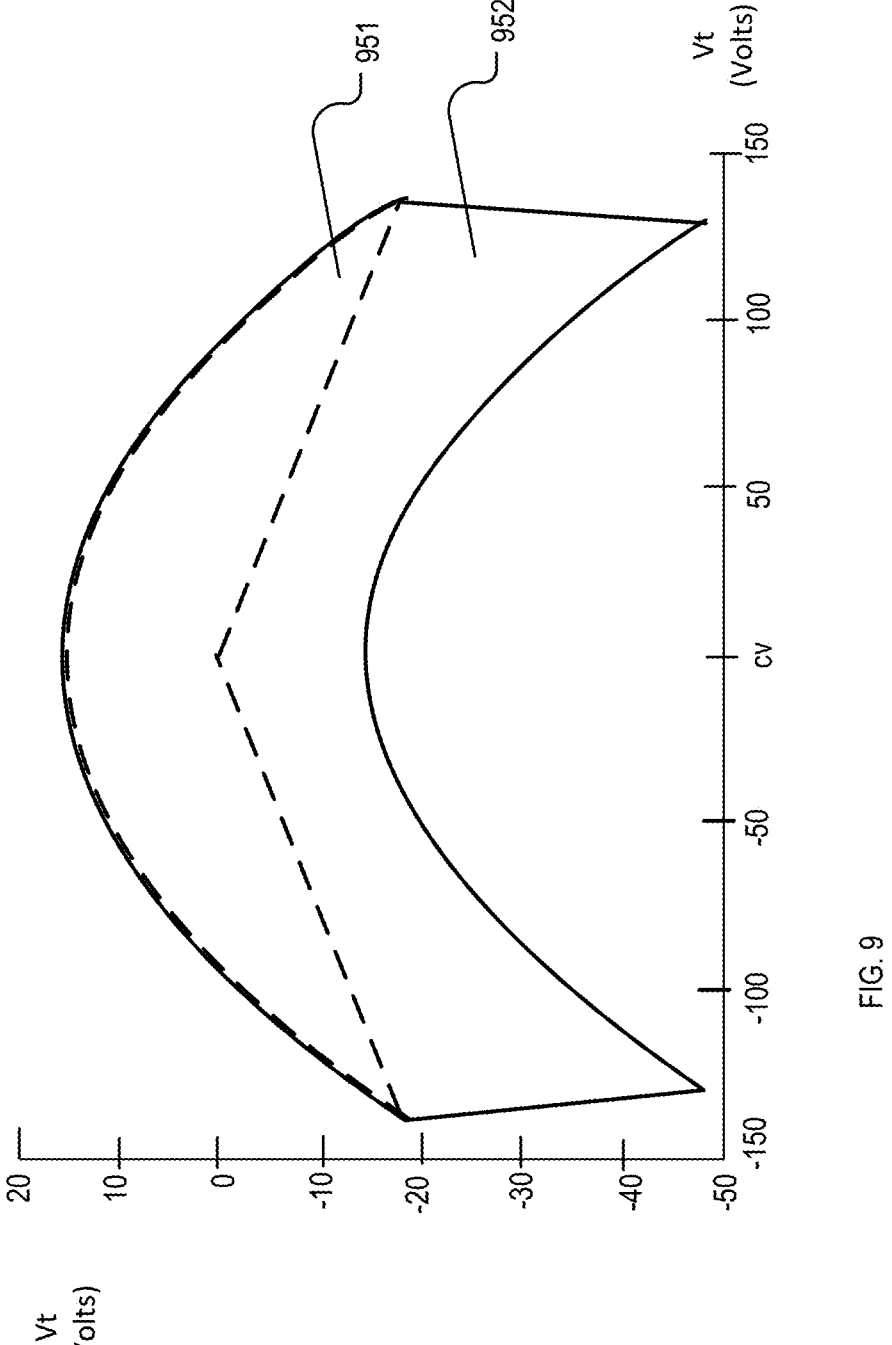
FIG. 9 is a plot of reclose zones.

FIG. 9 shows reclose zones 951 and 952. The reclose zone 951 is outlined in a dashed line style and is for a traditional network protector, which is controlled by a traditional controller that assumes an abnormal condition is present if there is reverse power flow. In other words, the reclose zone 951 is for a system that does not include the controller 450. The reclose zone 952 is outlined in a solid line style and is for the network protector 530_2, which is controlled by the controller 450. In FIG. 9, the x-axis (horizontal axis) represents the voltage vector (Vt) measured at the primary side of the distribution transformer 542_2, and the y-axis (vertical axis) represents the voltage vector (Vn) on the secondary or network side of the distribution transformer 542_2. The reclose zone 952 is defined by all of the differences between Vt and Vn that are less than a threshold. The reclose zone 951 is determined by traditional criteria.

If the measured voltage vector Vn at a particular time and the measured voltage vector Vn measured at that time fall inside the reclose zone 952, then the controller 450 issues a command to the network protector 530_2 to close. As shown in FIG. 9, the reclose zone 952 is larger than the reclose zone 951 and the reclose zone 952 also substantially overlaps the reclose zone 951. Accordingly, as compared to the traditional configuration, the configuration of the controller 450 allows more opportunities to reclose the network protector 530_2 and thus improves overall performance. The network protector 530_1 has a reclose zone that is similar to the reclose zone 952.

FIGS. 10A-10D, FIGS. 11A-11D, and FIGS. 12A-12D show examples of data from simulations of a spot network with 90% photovoltaic (PV) penetration. PV penetration of 90% indicates that the nominal PV power generation capacity is 90% of the nominal load. FIGS. 10A-10D and 11A-11D show data from a simulation in which a secondary electrical spot distribution network included two network protectors (NWP_36 and NWP_47) configured in a traditional manner and configured to trip in the presence of reverse power flow. The simulated system was fed by an AC power source and also included circuit breakers BRK_GA05, which was between the AC power source and NWP_36, and BRK_GA02, which was between the AC power source and NWP_47. FIGS. 12A-12D show data from a simulation in which the same secondary electrical distribution network included two network protectors configured in a manner similar to the network protectors 130_1 and 130_2, 430, 530_1 or 530_2. In other words, FIGS. 12A-12D show data from a simulation in which the network protectors allow reverse power flow if there is no fault or other abnormal condition.

Figures 10A, 10B, 10C, 10D:
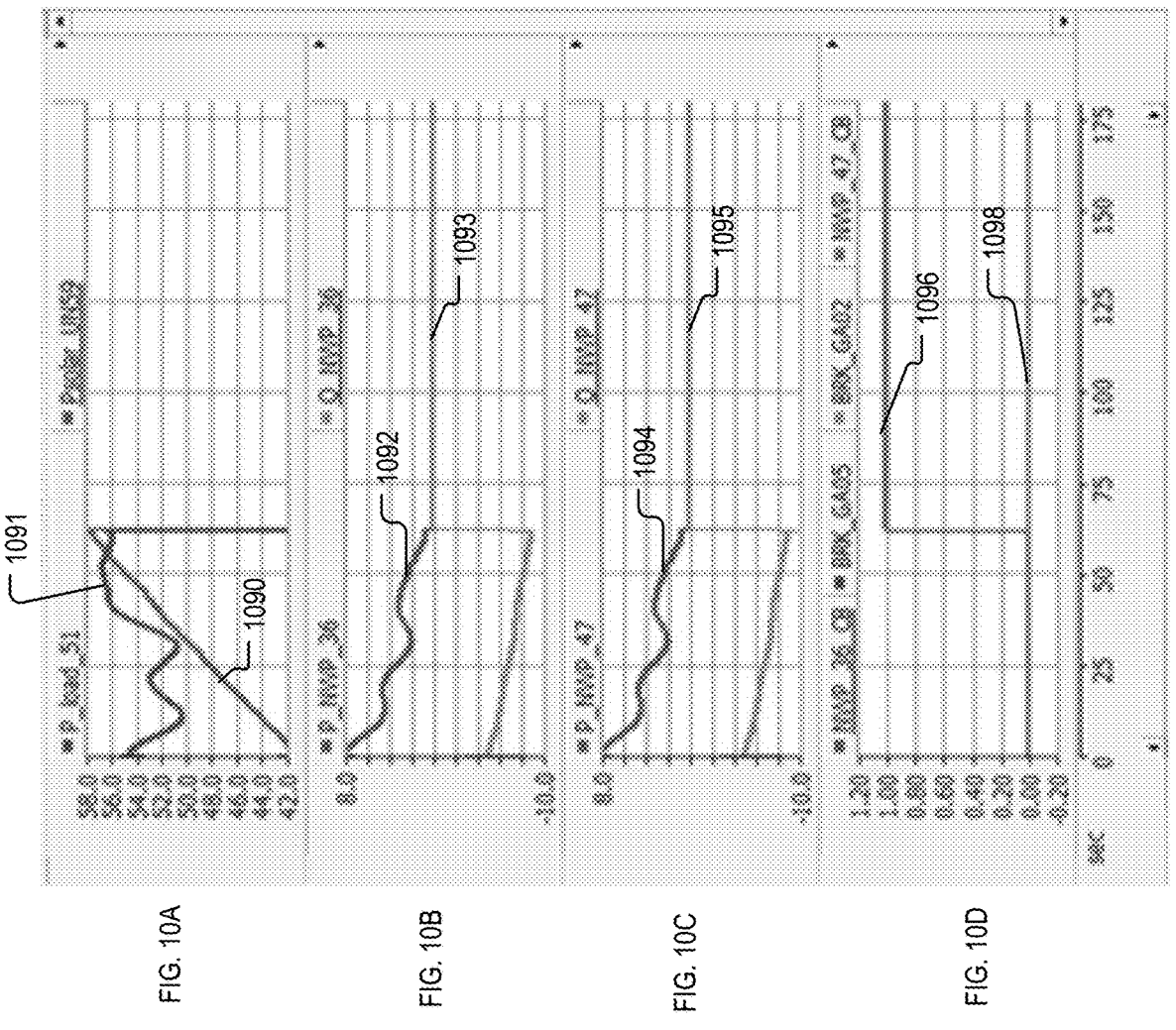
FIGS. 10A-10D show examples of simulated data.

FIGS. 10A-10D show unintentional tripping of the traditionally configured network protectors due to reverse power flow. FIG. 10A shows generated PV power (1090) and the power demand of the load (1091) as a function of time. FIG. 10B shows real (1092) and reactive power (1093) at the network protector NWP_36 as a function of time. FIG. 10C shows real (1094) and reactive power (1095) at the network protector NWP_47 as a function of time. FIG. 10D shows the status of NWP_36, NWP_47, BRK_GA05, and BRK_GA02 as a function of time, with a value of one (1) indicating open and a value of zero (0) indicating open. In FIG. 10D, NWP_36 and NWP_47 are represented in the plot labeled 1096, and BRK_GA05 and BRk_GA02 are represented by the plot labeled 1098. FIGS. 10A-10D have the same time axis.

Referring to FIG. 10A, around time t=55s, the amount of generated solar power (1090) exceeds the power demand of the load (1091). The excess power is returned to the distribution network as reverse power, and the network protectors NWP_36 and NWP_47 trip open (as shown in FIG. 10D) even though there is no fault or other abnormal condition. Referring to FIGS. 10B and 10C, after the network protectors NWP_36 and NWP_47 trip open, and no power flows. Thus, the excess solar power is not utilized and the network protectors NWP_36 and NWP_47 open unnecessarily.

Figures 11A, 11B, 11C, 11D:
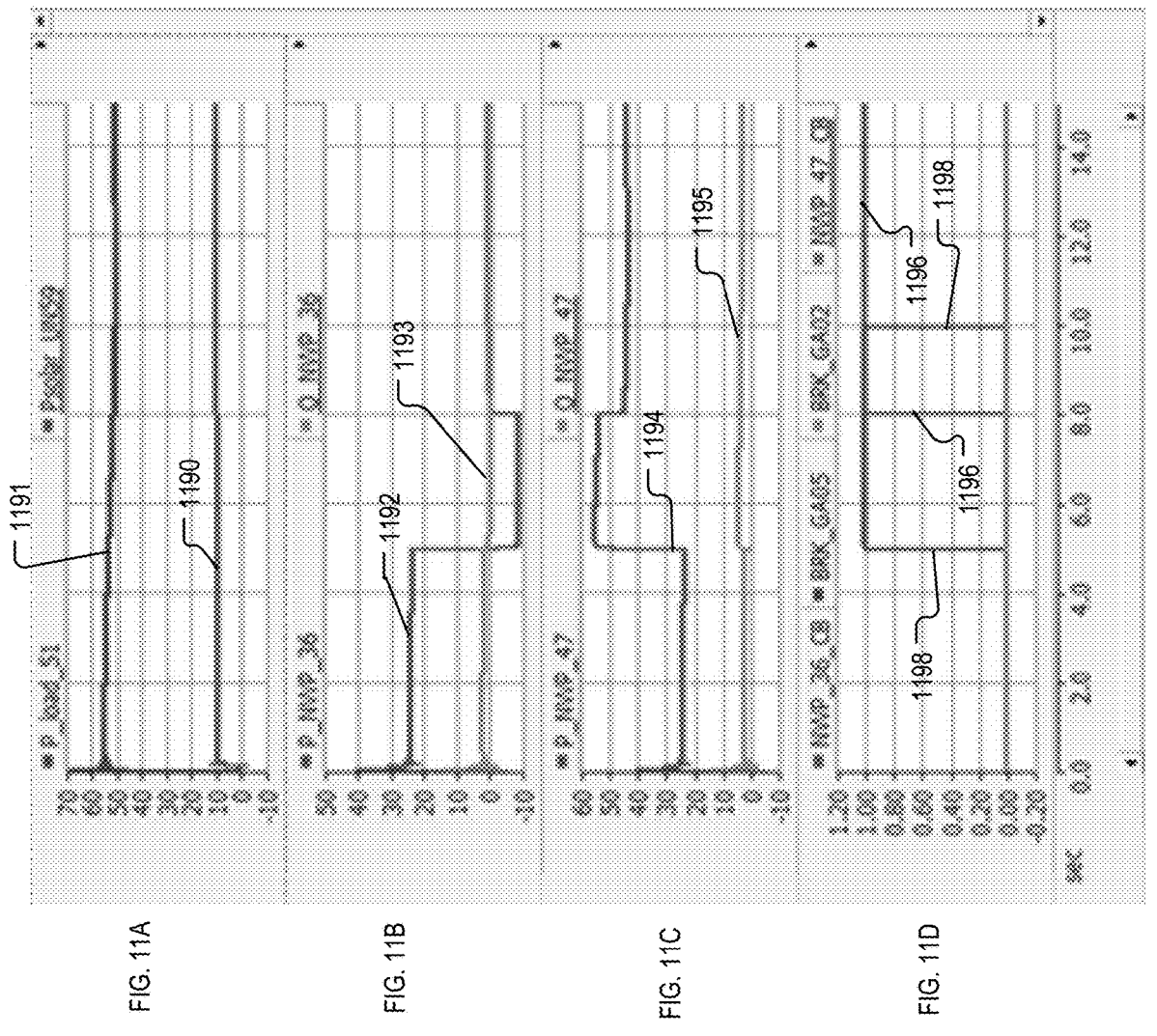
FIGS. 11A-11D show examples of simulated data.

FIGS. 11A-11D show the operation of the secondary spot network over a different period of time. In the simulation that produced the data in FIGS. 11A-11D, the medium-voltage circuit breaker (MVCB) BRK_GA05 associated with the network protector NWP_36 was opened at time t=5 s and reclosed at time t=8 s. FIG. 11A shows generated PV power (1190) and the power demand of the load (1191) as a function of time. FIG. 11B shows real (1192) and reactive power (1193) at a first network protector NWP_36 as a function of time. FIG. 11C shows real (1194) and reactive power (1195) at a second network protector NWP_47 as a function of time. FIG. 11D shows the status of status of NWP_36 (1196), NWP_47, BRK_GA05 (1098), and BRK_GA02 as a function of time, with a value of one (1) indicating open and a value of zero (0) indicating open.

Referring to FIG. 11B, the NWP_36 responds to the opening of the MVCB BRK_GA05 after about 3 seconds (at time t=8 s). However, due to the presence reverse power flow (the generated solar power shown as 1191 in FIG. 11A), the NWP_36 fails to reclose even after the MVCB recloses at time t=8 s. As shown in FIG. 11D, the status of the NWP_36 remains open even after the MVCB BRK_GA05 Thus, the traditionally configured NWP_36 is unable to distinguish between reverse power flow that occurs due to a fault or other abnormality and reverse power flow due to DER power generation.

Figures 12A, 12B, 12C, 12D:
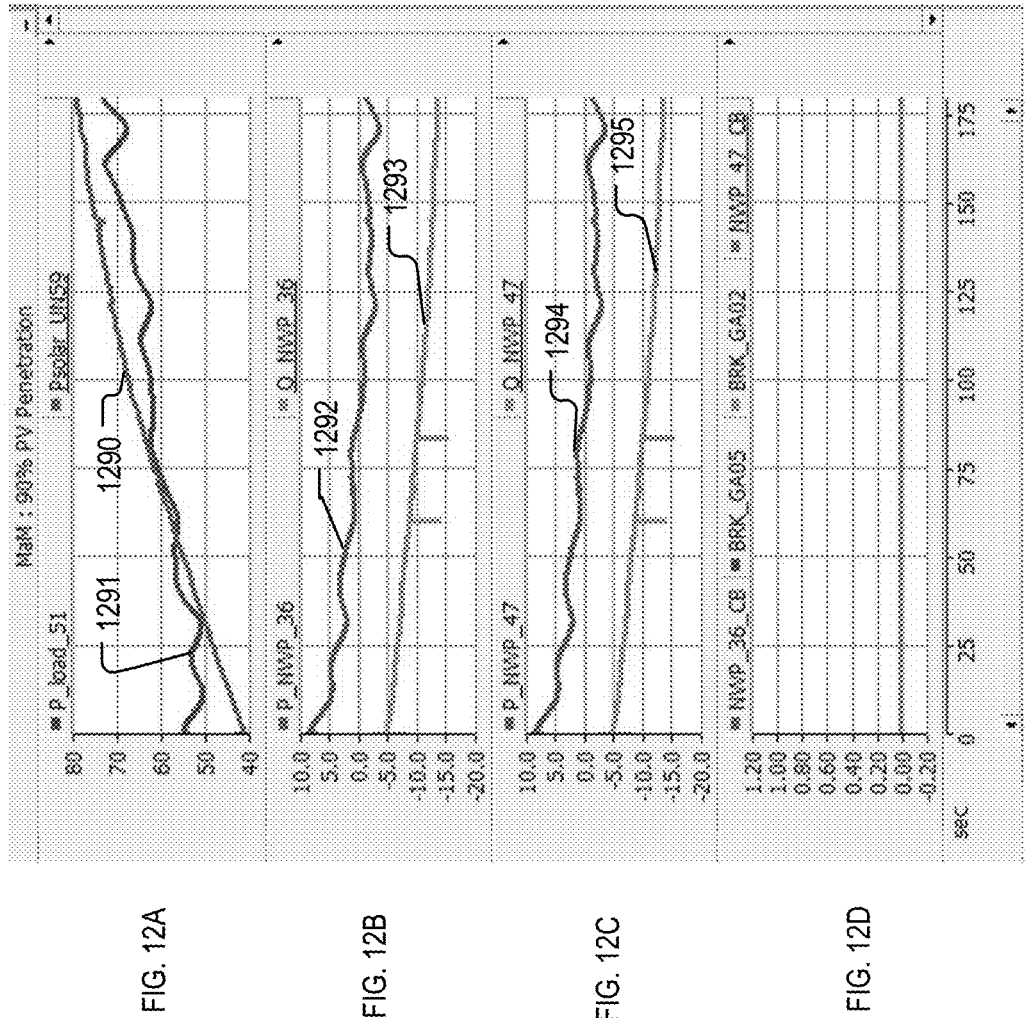
FIGS. 12A-12D show examples of simulated data.

FIGS. 12A-12D show data from a simulation of the same spot network (90% PV penetration) in which the network protectors NWP_36 and NWP_47 were configured in a manner similar to the network protectors 130_1 and 130_2, 430, 530_1 or 530_2. FIG. 11A shows generated PV power (1290) and the power demand of the load (1291) as a function of time. FIG. 12B shows real (1292) and reactive power (1293) at a first network protector NWP_36 as a function of time. FIG. 12C shows real (1294) and reactive power (1295) at a second network protector NWP_47 as a function of time. FIG. 12D shows the status of status of NWP_36 and NWP_47 as a function of time, with a value of one (1) indicating open and a value of zero (0) indicating open.

At the time t=55s generated solar power (1290) exceeded the power drawn by the load (1291) and the network protectors NWP_36 and NWP_47 observe reverse power flow. The trip function is activated, and a capacitor bank is controlled to inject 25 kVAR reactive power into the secondary spot distribution network. The reactive power is measured on either side of the capacitor bank (using, for example, the technique discussed with respect to FIGS. 6A and 6B) to determine the structure of the secondary spot distribution network. Because the reverse power flow is from excess PV energy generation, the network protectors NWP_36 and NWP_47 are not tripped (as shown in FIG. 12D), and the excess PV energy is utilized.

These and other implementations are within the scope of the claims.

What is claimed is:

1. A system comprising:
a network protector comprising:
a resettable switching apparatus configured to control an electrical connection between a distribution transformer and a first electrical feeder of a secondary electrical distribution network, the secondary electrical distribution network electrically connected to one or more distributed energy resources (DERs); and a controller configured to:

determine, after a test signal is provided to the secondary electrical distribution network, whether the secondary electrical distribution network has a radial structure or a mesh structure;

if the secondary electrical distribution network has the radial structure, control the resettable switching apparatus to open and disconnect the distribution transformer from the first electrical feeder of the secondary electrical distribution network; and if the secondary electrical distribution network has the mesh structure, control the resettable switching apparatus such that the distribution transformer and the first electrical feeder are connected to thereby allow one or more of the DERs to provide electrical power to the secondary electrical distribution network.

2. The system of claim 1, wherein the network protector further comprises a sensor configured to measure one or more electrical properties of electrical power in the first electrical feeder, and the controller is further configured to:

determine whether there is a change in at least one measured electrical property; and if there is the change in at least one electrical property, cause the test signal to be provided to the secondary electrical distribution network.

3. The system of claim 2, wherein the one or more electrical properties comprise any of current flow direction, voltage magnitude, voltage phase angle, active power, reactive power, and impedance.

4. The system of claim 1, wherein the controller is further configured to cause the test signal to be provided the secondary electrical distribution network by controlling the distribution transformer to perform a tap change operation, and the controller being configured to determine whether the secondary electrical distribution network has the radial structure comprises the controller comparing a voltage on a source side of the distribution transformer after the tap change operation to the voltage on the source side of the distribution transformer before the tap change operation.

5. The system of claim 4, wherein the tap change operation is associated with a tap step voltage, if the voltage on the source side changes by the tap step voltage, the secondary electrical distribution network is determined to have the radial structure, and if the voltage on the source side does not change by the tap step voltage, the secondary electrical distribution network is determined to have the mesh structure.

6. The system of claim 4, further comprising the distribution transformer.

7. The system of claim 1, wherein the controller is further configured to cause the test signal to be provided to the first electrical feeder by controlling a reactive power generation apparatus to inject the test signal into the secondary electrical distribution network, the test signal having a known amount of reactive power; and the controller being configured to determine whether the secondary electrical distribution network has the radial structure comprises the controller being configured to: compare an amount of reactive power on a side of the reactive power generation apparatus after the test signal is provided to the first electrical feeder to an amount of reactive power on the side of the reactive power generation apparatus before the test signal was provided.

8. The system of claim 7, wherein if the reactive power on the side of the reactive power generation apparatus changes by the known amount of reactive power, the secondary electrical distribution network is determined to have the radial structure; and if the reactive power on the side of the reactive power generation apparatus does not change by the known amount of reactive power, the secondary electrical distribution network is determined to have the mesh structure.

9. The system of claim 7, wherein if the reactive power on the side of the reactive power generation apparatus does not change, the secondary electrical distribution network is determined to have the radial structure; and if the reactive power on the side of the reactive power generation apparatus changes, the secondary electrical distribution network is determined to have the mesh structure.

10. The system of claim 7, further comprising the reactive power generation apparatus.

11. The system of claim 10, wherein the reactive power generation apparatus is a capacitor bank or an inverter.

12. The system of claim 1, wherein the controller is further configured to:

determine whether the resettable switching apparatus is open;

if the resettable switching apparatus is open, compare a magnitude of a voltage vector on a source side of the distribution transformer to a magnitude of a voltage vector on a secondary network side of the distribution transformer; and determine whether to close the resettable switching apparatus based on the comparison.

13. A network protector comprising:

a resettable switching apparatus configured to electrically connect to a low-voltage feeder of a secondary electrical distribution network;

a switch control configured to control a state of the resettable switching apparatus to thereby determine whether electrical current flows through the resettable switching apparatus; and a controller configured to:

determine whether a fault condition exists; and if the fault condition does not exist, allow electrical power to flow through the resettable switching apparatus in any direction, wherein the controller is configured to determine whether the fault condition exists by determining a structure of the low-voltage feeder; and the controller is configured to cause a test generation device to generate a test signal and to determine the structure of the low-voltage feeder based on a response to the test signal.

14. The network protector of claim 13, wherein the resettable switching apparatus comprises an air circuit breaker.

15. The network protector of claim 13, wherein the switch control comprises a relay.

16. The network protector of claim 13, further comprising a sensor system configured to measure one or more electrical properties of electrical power on the low-voltage feeder.

17. The network protector of claim 13, wherein the controller is further configured to cause the switch control to open the resettable switching apparatus if the fault condition exists.

18. The network protector of claim 13, wherein the controller is further configured to:

detect reverse power flow from a load toward a source on the low-voltage feeder of the secondary electrical distribution network;

analyze a response of the secondary electrical distribution network to the test signal; and determine whether to allow the reverse power to flow based on the analysis.

19. The network protector of claim 13, wherein the test generation device comprises a reactive power generation apparatus, and the controller is configured to control the reactive power generation apparatus to inject a reactive power test signal.

20. The network protector of claim 13, wherein the test generation device comprises a tap changer, and the controller is configured to operate the tap changer to generate the test signal.

* * * * *